(12) United States Patent
Griesmeier et al.

(10) Patent No.: US 8,016,724 B2
(45) Date of Patent: Sep. 13, 2011

(54) DRIVE TRAIN OF A MOTOR VEHICLE

(75) Inventors: Uwe Griesmeier, Markdorf (DE); Peter Reitz, Neukirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 588 days.

(21) Appl. No.: 12/097,285

(22) PCT Filed: Dec. 20, 2006

(86) PCT No.: PCT/EP2006/012268
§ 371 (c)(1),
(2), (4) Date: Jun. 13, 2008

(87) PCT Pub. No.: WO2007/085294
PCT Pub. Date: Aug. 2, 2007

(65) Prior Publication Data
US 2009/0000851 A1    Jan. 1, 2009

(30) Foreign Application Priority Data

Jan. 28, 2006 (DE) .......................... 10 2006 004 080

(51) Int. Cl.
*B60W 10/04* (2006.01)
*B60W 10/00* (2006.01)
*B60K 20/00* (2006.01)
*B60K 26/00* (2006.01)

(52) U.S. Cl. .......... 477/188; 477/92; 180/333; 74/473.3
(58) Field of Classification Search ............ 477/92, 477/184, 187, 188; 74/473.13, 473.19, 473.3; 180/333
See application file for complete search history.

(56) References Cited

U.S. PATENT DOCUMENTS

| | | | |
|---|---|---|---|
| 4,842,113 A | 6/1989 | Lutz | |
| 5,012,418 A | 4/1991 | Petzold | |
| 5,315,900 A * | 5/1994 | Teeter | 477/165 |
| 5,568,387 A | 10/1996 | Andersson | |
| 5,788,597 A * | 8/1998 | Boll et al. | 477/4 |
| 5,803,217 A * | 9/1998 | Park | 192/3.31 |
| 6,939,265 B2 | 9/2005 | Rustige et al. | |
| 6,945,349 B2 | 9/2005 | Colling et al. | |
| 6,979,280 B2 * | 12/2005 | Oshima et al. | 477/186 |
| 7,214,166 B2 * | 5/2007 | Steen et al. | 477/185 |

FOREIGN PATENT DOCUMENTS

| | | |
|---|---|---|
| DE | 32 08 715 A1 | 9/1983 |
| DE | 37 09 388 A1 | 10/1987 |
| DE | 43 24 210 A1 | 4/1994 |
| DE | 43 34 210 A1 | 4/1994 |

(Continued)

*Primary Examiner* — Roger Pang
(74) *Attorney, Agent, or Firm* — Davis & Bujold, P.L.L.C.

(57) ABSTRACT

A drive train of a motor vehicle, with a drive engine, a torque converter, an additional brake, a retarder, a manual actuator device for a power control element, a manually operated preselector element for an operating range of the torque converter, a manually operated preselector element for selecting braking resistance of the additional brake, a manual control element for actuating a brake that decelerates the motor vehicle and an electronic control unit for exchanging and processing signals and data of the drive train and/or of the motor vehicle. The preselector element for the additional brake is connected to the electronic control unit such that starting from a zero position "0", it can be actuated in a direction "I" for signaling the selection of a braking resistance of the additional brake, and also in another direction "II" for signaling the activation of a drive-power-off rolling or coasting operation mode.

6 Claims, 1 Drawing Sheet

FOREIGN PATENT DOCUMENTS

| | | |
|---|---|---|
| DE | 44 46 120 A1 | 7/1995 |
| DE | 44 20 116 A1 | 12/1995 |
| DE | 195 32 946 A1 | 3/1997 |
| DE | 195 37 273 A1 | 4/1997 |
| DE | 102 21 701 A1 | 11/2002 |
| DE | 102 57 257 A1 | 6/2004 |
| DE | 600 09 749 T2 | 4/2005 |
| DE | 10 2005 003 608 A1 | 8/2006 |

* cited by examiner

DRIVE TRAIN OF A MOTOR VEHICLE

This application is a national stage completion of PCT/EP2006/012268 filed Dec. 20, 2006, which claims priority from German Application Serial No. 10 2006 004 080.5 filed Jan. 28, 2006.

FIELD OF THE INVENTION

The invention concerns a drive train of a motor vehicle.

BACKGROUND OF THE INVENTION

For a long time vehicles have been known which are equipped with a coasting function in order to reduce fuel consumption. This operates in such manner that when the driver throttles down, the driving internal combustion engine is disconnected from the driven vehicle wheels by disengaging a clutch in the drive train. The speed of the combustion engine can then be reduced to an idling speed so that fuel is saved. To reduce the consumption still more, it is also known, in such thrust operation phases of the motor vehicle with the drive power disconnected, to cut off the supply of fuel to the combustion engine completely although, in such a case, more effort is needed for the operation of auxiliary aggregates. In both these operating modes, however, the braking action of the combustion engine, during thrust operation of the vehicle, is not available.

For those familiar with the subject, it is obvious that corresponding to the operating modes for the combustion engine, when driving downhill, the speed of the motor vehicle will increase steadily and, in the absence of an engine braking action, this can only be prevented by actuating a service brake or an additional brake (retarder). In passenger motor vehicles, usually only a service brake associated with the wheels is available so that when such vehicles are driving down steep hills, thrust operation phases with the drive power disconnected are usually avoided.

Further, in the Type FH 12 Volvo® goods vehicle a drive train is known with a drive motor in the form of an internal combustion engine with a torque converter made as an automatic splitter transmission with 12 forward gears with an actuator device to be actuated manually in the form of an accelerator pedal for a power control element (for example, a fuel injection pump) of the drive motor, and with a manually actuated preselector element in the form of a transmission gear range selector lever, located next to the driver's seat, and with a manually operated actuator in the form of a brake pedal for actuating a service brake which decelerates the driving speed of the vehicle.

An electronic control unit, associated with the drive train detects a condition in which no drive power is needed or an engine brake is not engaged; whether an automatic speed control unit is engaged; whether the transmission is in automatic mode, and whether one of the forward gears 7 to 12 is engaged. If all these conditions exist simultaneously, the splitter transmission is automatically shifted to neutral so that the torque-transmitting action, between the combustion engine and the driven wheels, is interrupted.

To overcome the downhill driving problem mentioned earlier, this known coasting function is immediately suppressed by re-establishing the torque flow in the drive train when either the brake pedal or the accelerator pedal is actuated or when the engine brake is engaged.

In addition, in the unpublished patent application DE 10 2005 003 608.2, a method is proposed for operating the drive train of a vehicle, which comprises a drive motor, for example an internal combustion engine, and a torque converter, in the form of an automatic transmission or an automated shift transmission; with a manually operated actuator device for a power control element of the drive motor; with a manually operated preselector element for an operating range of the torque converter or transmission; with a manually operated control element to actuate a brake that decelerates the driving speed of the vehicle, and with an electronic control unit for receiving, processing and emitting signals and data of the drive train and/or of the vehicle. Furthermore, a freewheel device with a coasting function is associated with this drive train.

In order to be able quickly and flexibly, between the conditions "coasting effect permitted" and "coasting effect blocked" by actuating the actuator device for the power control element or by actuating the control element that acts on the brake, the freewheel device is associated with the drive train in such a manner that:

a) in thrust operation when the actuator element for the power control element has not been actuated, the coasting function is at first permitted, and b) when the control element for reducing the driving speed is then actuated, the coasting function is blocked, and c) when the coasting function in thrust operation should be permitted again, this is done by operating the actuator device of the power control element.

Furthermore, additional brakes in the practice are known, e.g., hydrodynamic or electrodynamic retarders, which are mainly used in commercial vehicles and which serve to relieve the load on the service brakes associated with the wheels, in that besides the conventional engine brake they have an additional braking action as the result of retarder-internal fluid friction or the production of electric eddy currents. For this, a preselector element, for example in the form of an operating lever, conveys the driver's braking power demand in that, starting from a zero position, the braking resistance increases as the movement of the operating lever is increased or repeated. In combination with an electronic control unit, the retarder can be actuated accordingly.

Regardless of the above, as already mentioned earlier, it can be expedient and advantageous in certain operating situations of the motor vehicle to move the vehicle in the unbraked, rolling condition, whereby fuel can be saved and noise and emissions reduced.

Against this background, the purpose of the invention is to improve upon the prior art by providing the simple and inexpensive possibility, in a drive train of a motor vehicle having an additional brake, in particular a retarder, of explicitly calling for an unbraked rolling condition of the vehicle, also referred to as rolling or coasting operation, and to design the manipulations that produce that operating condition in a manner that is simple and transparent for the driver.

SUMMARY OF THE INVENTION

Accordingly, the invention concerns a drive train of a motor vehicle, with a drive engine, a torque converter, an additional brake, e.g., an engine brake, a retarder or a hybrid module, a manually operated actuator device for a power control element of the drive engine, a manually operated preselector element for an operating range of the torque converter, a manually operated preselector element for selecting a defined braking resistance of the additional brake, a manually operated control element for actuating a service brake that decelerates the driving speed of the motor vehicle and an electronic control unit for receiving, processing and emitting signals and data of the drive train and/or of the motor vehicle.

At this point, it should be made clear that the term "torque converter" as used herein includes any devices which receives, changes and passes on torque delivered by the drive engine. Thus, the term "torque converter" clearly includes transmissions of any design.

In this drive train, in order to achieve the stated objective, it is now additionally provided that the preselector element of the additional brake is connected by control technology means to the electronic control unit in a such manner that starting from a zero position "0", it can be actuated manually both in a direction "I" for signaling the selection of a braking resistance of the additional brake, e.g., the engine brake, the retarder or the hybrid module and also in another direction "II" for signaling the activation of a drive-power-off rolling or coasting operation mode of the motor vehicle in the sense that the drive torque delivered by the drive engine is disconnected.

By virtue of this measure, the preselector element for the additional brake, known in itself, is extended by a further selection option, namely, the option of activating a drive-power-off rolling or coasting operating mode of the motor vehicle in the sense that the drive torque of the drive engine is disconnected, preferably by opening a clutch in the drive train. For this, to activate the rolling or coasting operating mode, the actuation device of the preselector element is moved from a zero position in another direction, preferably the opposite direction, to the actuation direction for selecting the braking resistance of the additional brake.

In that case, the respective actuation directions of the preselector element are logically comprehensible to the driver, since the activation of the rolling or coasting operating mode can also mean interrupting a braking torque of the drive engine, which is logically opposed to applying a braking torque by way of the additional brake.

In a particularly advantageous way, the two actuation modes in question are integrated in a single, already existing preselector element, whereby an additional actuating element for activating the drive-power-off rolling or coasting operating mode and the resulting cost-increasing complexity, are avoided.

According to a particularly advantageous design feature of the invention, the preselector element for the additional brake and the rolling or coasting operating mode is made as a preselector element which automatically springs back, at least from the position for activating the rolling or coasting mode in the sense of disconnecting the drive torque of the drive engine, to its zero or rest position. Accordingly, the rolling or coasting mode activation position is not ratcheted so that when its actuation is no longer needed, the preselector element can spring back again automatically to its zero or rest position, for example under the force of a spring.

Advantageously, this provides the prerequisites for beginning to terminate a set rolling or coasting operating mode of the motor vehicle by operating the actuator device for the power control element of the drive engine; the preselector element for selecting a defined braking resistance of the additional brake; the control element for actuating a brake that decelerates the driving speed of the motor vehicle and/or as a function of other operating and/or other driving conditions of the motor vehicle, such as the current driving speed; the temperature of the drive engine and/or that of any fluid necessary for the function of a retarder; the currently engaged torque converter or transmission gear; a measured or calculated drive torque; the current determined distance and/or speed values of other vehicles and/or such like, but without reaching or remaining in an inconsistent actuation condition of the preselector element once the rolling or coasting operating mode has come to an end.

In addition, it is provided that the rolling or coasting operation of the motor vehicle is enabled by at least one freewheel device in the drive train, for example a clutch mechanism, to disconnect the driven vehicle wheels from the drive engine.

Finally, it is proposed that the preselector element of the additional brake is made in the manner of a pivoting lever, a rotating lever or a pull/push lever.

BRIEF DESCRIPTION OF THE DRAWINGS

The invention will now be described, by way of example, with reference to the accompanying drawings in which.

DETAILED DESCRIPTION OF THE INVENTION

Figure 1:
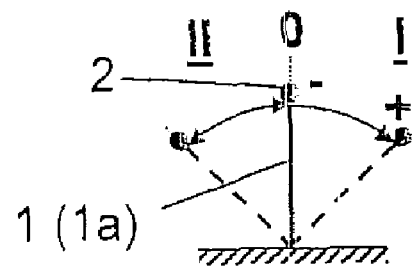
FIG. 1 is a schematic representation of a first of three possible embodiments of the preselector element for the additional brake described above.

According to FIG. 1, a preselector element 1 of the additional brake (not shown here) arranged in a drive train of the motor vehicle, known in itself (not illustrated further), is made as a pivoting lever 1a with a knob 2. In its starting position, the pivoting lever 1a is at a zero or a rest position designated by "0" and it can be swivelled in two different actuation directions "I" and "II".

As can be seen in this case, the two actuation directions "I" and "II" are preferably exactly opposite one another. However, other actuation directions "I" and "II", different from one another, are also possible (not illustrated further) and are thus covered by the invention.

According to this example embodiment, the actuation direction "I" is associated with the selection of a defined braking resistance to be applied by the additional brake, such that as the swivel angle of the pivoting lever 1a is increased, the braking resistance increases.

In contrast, the actuation direction "II" relates to activation of the rolling or coasting operating mode of the motor vehicle, the double arrow being intended to indicate that at least once the rolling or coasting mode has been actuated or put into operation, the pivoting lever 1a automatically springs back to its initial or zero position.

The pivoting lever is electrically connected to a control unit known in itself (not shown here), which generates corresponding control signals either to set the selected braking resistance of the additional brake or to activate the rolling or coasting operation of the motor vehicle, for instance by opening a clutch in the drive train.

When a rolling or coasting operating mode of the motor vehicle has been chosen, this is preferably terminated by operating an actuator device for the power control element of the drive engine, the preselector element 1 or pivoting lever 1a in the direction for selecting a defined braking resistance of the additional brake, a control element for actuating a brake that decelerates the driving speed of the motor vehicle, and/or as a function of other operating and/or driving conditions of the motor vehicle, such as its current driving speed, the temperature of the drive engine and/or any fluid needed for the function of a retarder, the gear currently engaged in the torque converter or transmission, a measured or calculated drive torque, the currently determined distance and/or speed values of other vehicles, and/or suchlike. For this, by virtue of its autonomous restoration, the preselector element 1 or pivoting lever 1a for the additional brake is already in its zero or rest position and is available for a subsequent actuation.

Figure 2:
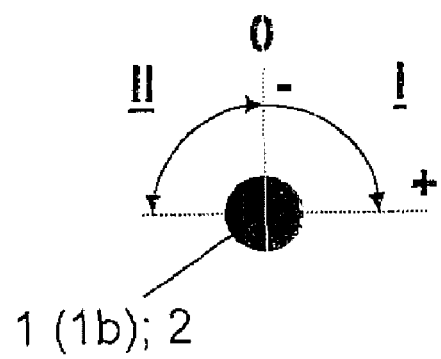
FIG. 2 is a schematic representation of a second of three possible embodiments of the preselector element for the additional brake described above.
Figure 3:
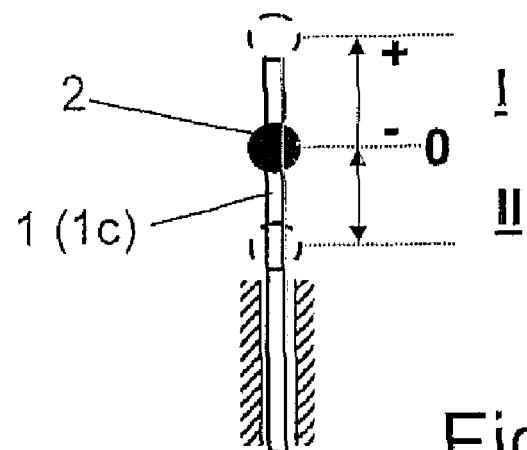
FIG. 3 is a schematic representation of a third of three possible embodiments of the preselector element for the additional brake described above.

The example embodiment, shown in FIG. 2, differs from the example embodiment described above, only in that instead of a pivoting lever 1a, a rotating lever 1b is used. In contrast, in FIG. 3, a pull/push lever 1c is provided. Here too, the two actuation functions in question are advantageously integrated in the single preselector element 1 already present in the vehicle. Although the actuation directions "I" and "II" for activating the respective aggregate reactions are different, the vehicle operation modes associated with them, such as coasting operation or additional brake actuation, in particular retarder braking operation, are exactly the same for all three embodiments.

REFERENCE NUMERALS 1 preselector element
1a pivoting lever
1b rotating lever
1c pull/push lever
2 knob

The invention claimed is:

1. A drive train of a motor vehicle comprising:
a drive engine,
a torque converter,
an additional brake,
a manually operated actuator device for a power control element of the drive engine,
a manually operated first pre-selector element for an operating range of the torque converter,
a manually operated second pre-selector element (1) for selecting a defined braking resistance of the additional brake,
a manually operated control element for actuating an other brake that decelerates a driving speed of the motor vehicle, and
an electronic control unit for receiving, processing and emitting signals and data of at least one of the drive train and the motor vehicle,
wherein the second pre-selector element (1) of the additional brake is connected by control technology means to the electronic control unit such that the second pre-selector element (1) is manually actuatable, from a zero position ("0"), in a first direction ("I") for selecting the defined braking resistance of the additional brake, and in a second direction ("II") for actuating one of a drive-power-off rolling and coasting operation mode of the motor vehicle such that a drive torque delivered by the drive engine is disconnected.

2. The drive train according to claim 1, wherein the second pre-selector element (1) of the additional brake automatically returns back to the zero position at least from a position for actuating the one of the drive-power-off rolling and coasting operating mode of the motor vehicle.

3. The drive train according to claim 1, wherein after the one of the drive-power-off rolling and coasting operating mode of the motor vehicle is actuated, the one of the drive-power-off rolling and coasting operating mode of the motor vehicle is terminated by operating at least one of the actuator device for the power control element of the drive engine, the second pre-selector element (1) for selecting the defined braking resistance of the additional brake, the control element for actuating the other brake that decelerates the driving speed of the motor vehicle, and as a function of at least one other operating and other driving conditions of the motor vehicle, including a current driving speed, a temperature of the drive engine and any fluid, necessary for function of the retarder, one of a currently engaged torque converter and a transmission gear, one of a measured and a calculated drive torque, a current determined distance and a speed value of other vehicles.

4. The drive train according to claim 1, wherein the one of the drive-power-off rolling and coasting operation is enabled by at least one of a freewheel device and a clutch mechanism which disconnects driven vehicle wheels from the drive engine.

5. The drive train according to claim 4, wherein the second pre-selector element (1) of the additional brake is one of a pivoting lever (1a), a rotating lever (1b), and a pull/push lever (1c).

6. The drive train according to claim 1, wherein the additional brake is one of an engine brake, a retarder and a hybrid module.

* * * * *